March 18, 1941.  W. A. BARNES  2,235,569
ELECTRIC APPLIANCE CASING
Filed July 10, 1939    5 Sheets-Sheet 1

INVENTOR.
William A. Barnes
BY Woodling and Krost
ATTORNEY.

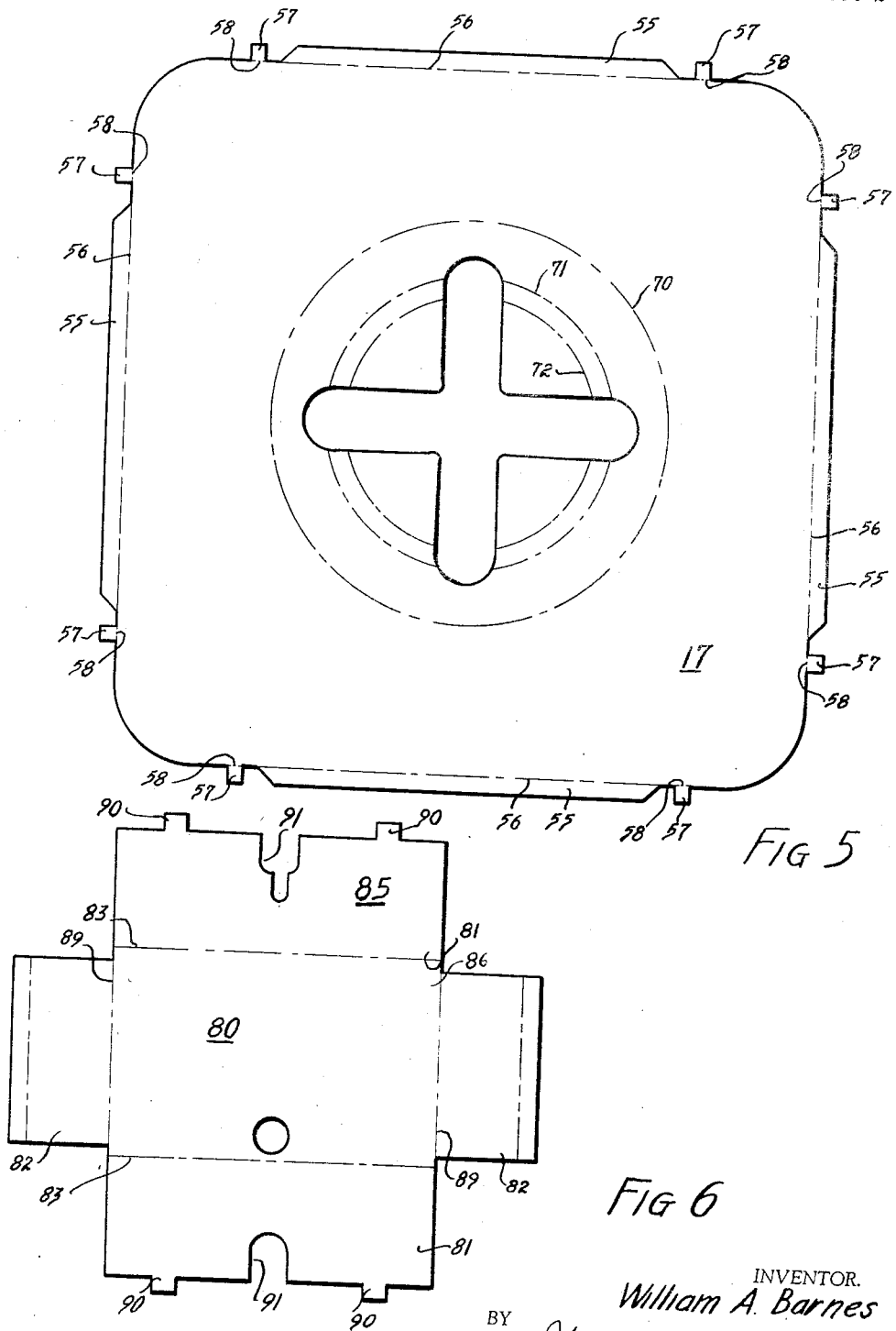

March 18, 1941.　　　　W. A. BARNES　　　　2,235,569
ELECTRIC APPLIANCE CASING
Filed July 10, 1939　　　　5 Sheets-Sheet 3

INVENTOR.
William A. Barnes
BY Woodling and Krost
ATTORNEY.

March 18, 1941.   W. A. BARNES   2,235,569
ELECTRIC APPLIANCE CASING
Filed July 10, 1939   5 Sheets-Sheet 4

INVENTOR.
William A. Barnes
BY Hoodling and Krost
ATTORNEY.

March 18, 1941.　　　W. A. BARNES　　　2,235,569
ELECTRIC APPLIANCE CASING
Filed July 10, 1939　　　5 Sheets-Sheet 5

INVENTOR.
William A. Barnes
BY Stoodling and Krost
ATTORNEY.

Patented Mar. 18, 1941

2,235,569

UNITED STATES PATENT OFFICE 2,235,569

ELECTRIC APPLIANCE CASING

William A. Barnes, Mansfield, Ohio, assignor to Dominion Electrical Manufacturing, Inc., a corporation of Ohio Application July 10, 1939, Serial No. 283,607

8 Claims. (Cl. 219—37)

My invention relates, in general, to electric heaters and more particularly to electric hot plates and a method of constructing same of light weight metal.

An object of my invention is to provide an economical construction for hot plates.

Another object of my invention is to eliminate operations in the assembling of a hot plate.

Another object of my invention is to provide a hot plate casing which may be made of a relatively thin metal but which is strong and rigid due to stiffening means which are integral with the walls of the casing.

Another object of my invention is to provide a heater having substantially all of its raw edges turned inward to enhance the appearance of the heater and to enable the use of paint and enamel which otherwise would "pull away" from the raw edge.

A further object of my invention is to so design the inwardly turned edges that they become a stiffening truss and thereby permit the use of a light gage metal for the heater.

A further object of my invention is to cut away portions of the stiffening truss at the corners of the hot plate leaving other portions to which leg members can be attached.

A still further object of my invention is to provide leg means for the corners of my hot plate and to so shape the leg members that they stiffen the assembled hot plate at those points where the stiffening truss has been cut away to provide engaging means for the legs.

Another object of my invention is to provide a heater in which each essential part is arranged to provide the maximum amount of stiffness for itself and in which all essential parts co-act with other parts to brace each other and thereby provide the maximum amount of stiffness for the assembled heater.

A further object of my invention is to provide an electric hot plate having a top surface on which food may be heated and having side walls which remain relatively cool.

A still further object of my invention is to provide a hot plate having a top, sides and legs and arranging the parts in such a manner that the legs are attached to the top, and the sides are attached to the legs leaving a space between the top and the sides to limit the heat transfer therebetween.

A further object of my invention is to provide a hot plate having a heating unit attached to a top portion and to provide means to limit the amount of the heating unit which can touch the top portion.

Other objects and a fuller understanding may be had by referring to the following description and claims, taken in conjunction with the accompanying drawings, in which like parts are designated by like reference characters and in which:

Figure 5 is a plan view of the die stamped top portion of my heater in its flat condition.

Figure 6 is a plan view of the die stamped shield which is used to protect an electric switch from excessive heat.

In the production of many low-cost metal electrical appliances it is necessary to use a light weight metal which, when formed and assembled in an ordinary manner, is incapable of providing the necessary amount of stiffness to assure a satisfactory appliance, and to so design the appliance that the various parts co-act with each other thereby stiffening the appliance to a sufficient degree.

My invention comprises a casing for a hot plate the various parts of which are made of a light weight metal shaped to provide the maximum stiffness and which brace each other to form a rigid frame.

Figure 1:
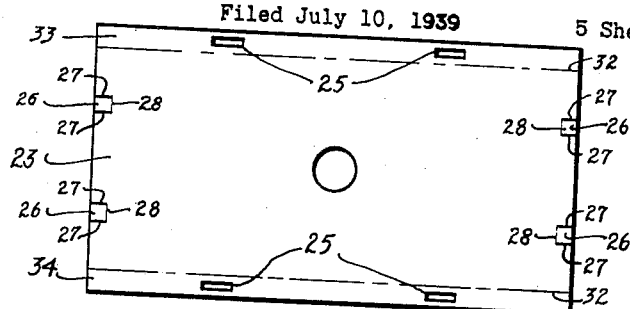
Figure 1 is a plan view of the die stamped forward wall of my heater showing attaching slots and showing, by construction lines, the lines along which the wall is bent to increase its stiffness.
Figure 9:
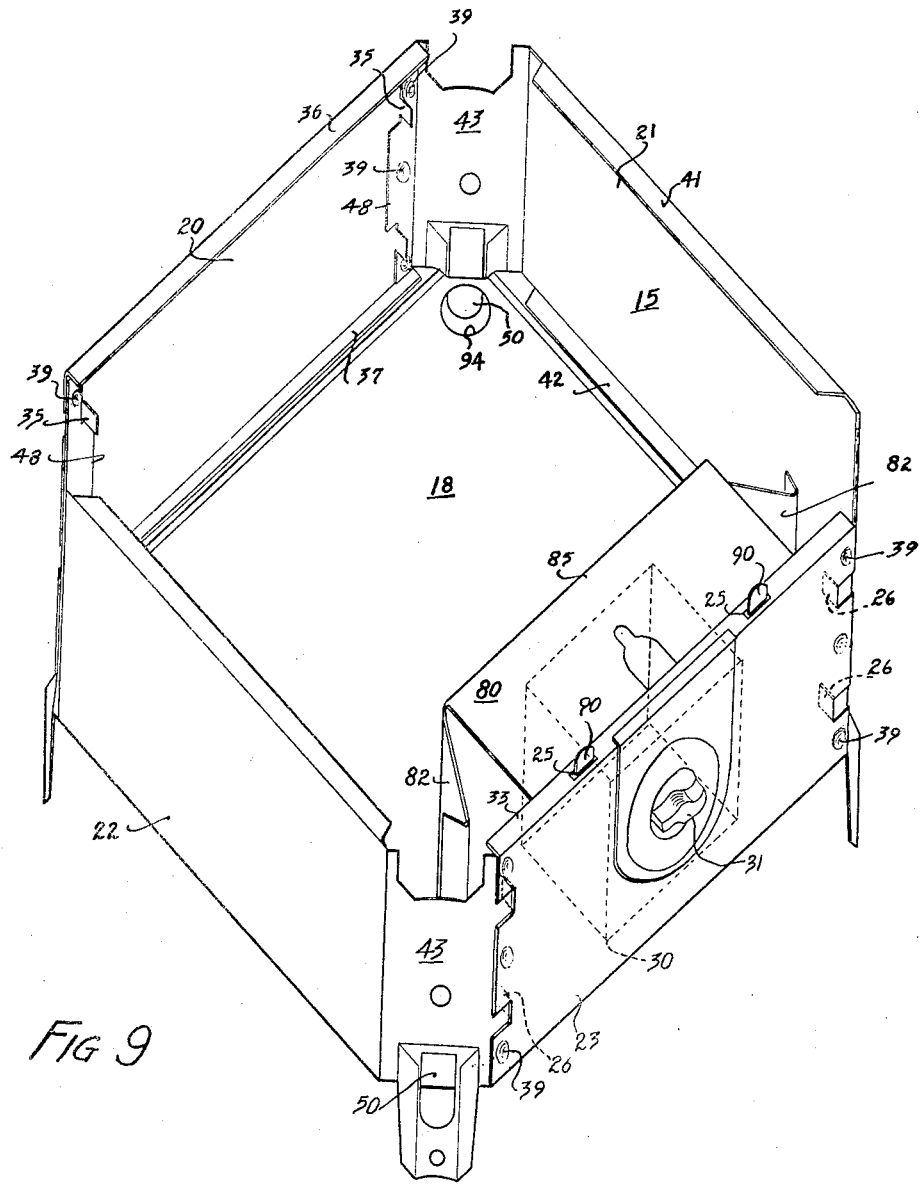
Figure 9 is an isometric view showing the front, rear and side walls of my heater after they have been bent into their final position and spot welded together to form a rigid wall frame. The switch shield and bottom members are shown in position and attached to the wall frame.

The casing shown generally in Figure 9 and indicated by numeral 15 comprises wall means 16, a top portion 17 and a bottom portion 18. The wall means 16 comprises a rear wall 20, a right side wall 21, a left side wall 22, and a front wall 23. The front wall 23 is die stamped into a rectangular shape as is shown in Figure 1. Tab slots 25 are cut out of the wall 23 near the top and bottom edges. Foldable tabs 26 are cut into the right and left sides of the wall 23 by cutting through the metal along lines 27 and by establishing fold lines 28 along which the tabs 26 may be folded. A control hole 29 is cut into the front wall 23 to receive the control shaft of an electric switch 30 having a switch knob 31. To increase the stiffness of the front wall 23 fold lines 32 are established and the wall bent substantially 90 degrees along each of the lines thereby establishing turned top and bottom edges 33 and 34. This makes the wall 23, in effect, substantially a channel thereby materially increasing its stiffness. The rear wall 20 is not shown as a separate unit since it is the same size and shape as the front wall. The only differences in the rear wall 20 from the front wall 23 are that the rear wall does not have a control hole 29 nor does it have tab slots 25. As may be seen in Figure 9, however, the rear wall 20 has foldable tabs 35 which are similar to the front wall foldable tabs 26 and it has folded top and bottom edges 36 and 37 to increase its stiffness.

Figure 2:
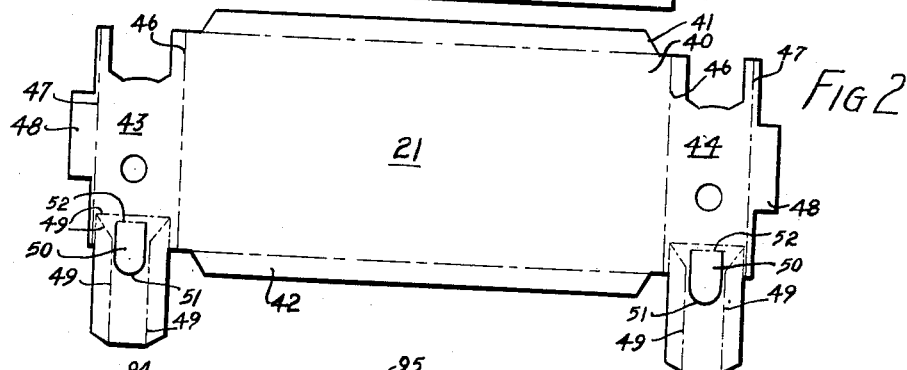
Figure 2 is a plan view of one of the die stamped side walls showing, by construction lines, the lines along which the wall is bent to increase its stiffness. In my heater there are two side units of this type but as they are identical I have only shown one.

The right and left side walls 21 and 22 are similar so I have illustrated only one of them in Figure 2. Each side wall as it is die stamped is comprised of a substantially flat surface 40 having a top edge 41 and a bottom edge 42 adapted to be turned inward substantially 90 degrees to increase the stiffness of the side unit as may be seen in Figure 9 and a pair of leg members 43 and 44, one at each end of the flat surface 40. Figure 2 shows a side wall 21 or 22 as it looks in the flat after the die stamping operation and Figure 9 shows the side walls 21 and 22 after they are bent into final shape and assembled with the front and rear walls. It is further seen in Figure 2 that the leg members 43 and 44 are die stamped integral with the flat wall portions and it may be seen in Figure 9 that they are bent inward from the side wall approximately 45 degrees before assembling to the front and back walls. The construction lines 46 and 47 show where the leg members are bent approximately 45 degrees. Shoulder portions 48 are stamped integral with the leg members and adapted to fit snugly between the foldable tabs 26 when the side walls are assembled. To increase the stiffness of the leg members 43 and 44 they are crimped along the construction lines 49. This crimping operation increases the effective depth of the leg members thereby materially increasing the stiffness of the unit. Folding tabs 50 are provided in the leg members by cutting along line 51 and by leaving the leg uncut along line 52 which therefore becomes the fold-line for the tab 50.

To assemble the shaped and formed wall means the front wall 23 is placed between the left side wall 22 and the right side wall 21, as may be seen in Figure 9, and the rear wall 20 is placed in a similar position. The shoulders 48 on the right and left side walls are slid into contact with the foldable tabs 35 on the rear wall and the foldable tabs 26 on the front wall, and the walls spot welded together at points 39. This establishes a substantially rectangular wall means with diagonal corners which are the internal leg means 43.

The top portion 17 which is die stamped may be seen in its flat condition in Figure 5 and comprises a single sheet of metal having a substantially cross-shaped opening cut out of the center portion. Around the edges of the top portion 17 there are portions 55 set off from the internal portion by fold-lines 56 and adapted to be folded inward to provide a truss action to stiffen the top portion 17. Tabs 57 are also integral with the top portion 17. They are adapted to be folded along lines 58 thereby becoming the means by which outside legs 61 are attached to the top portion 17.

Figure 8:
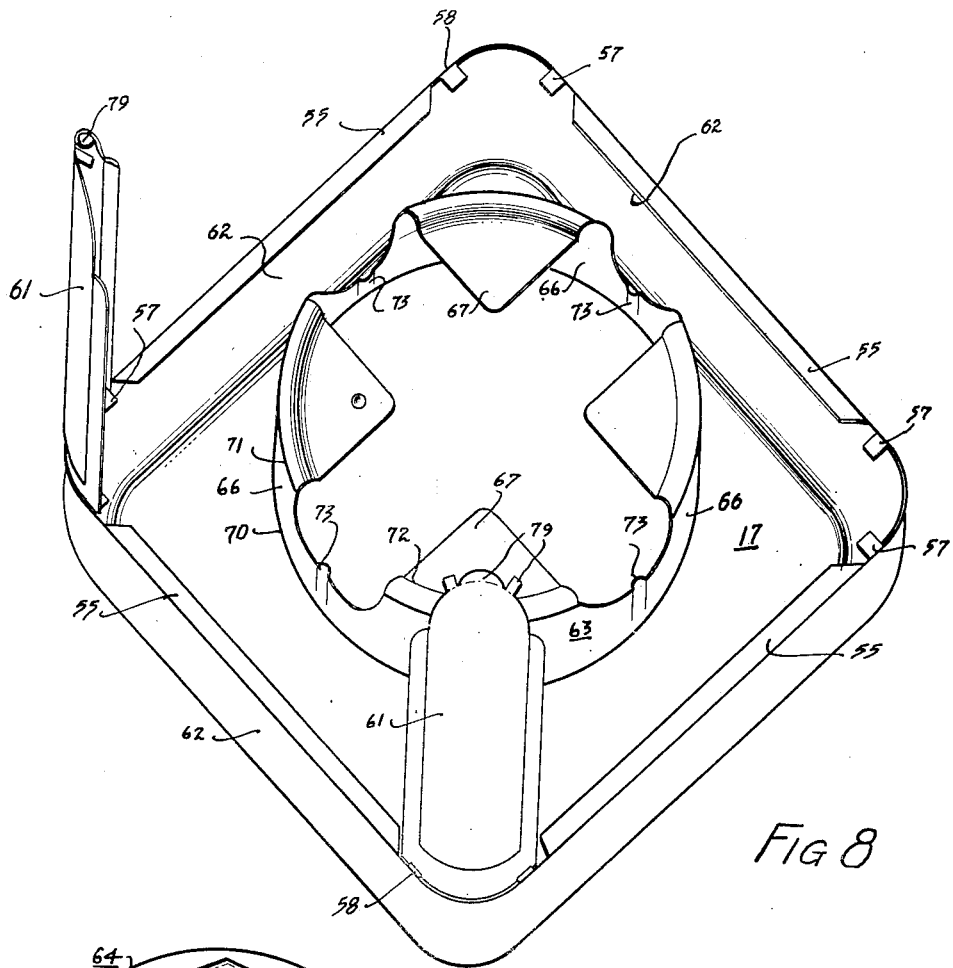
Figure 8 is an isometric view looking at the bottom side of the top portion of my heater after the top portion has been bent into its final shape and showing two of the four legs in position. The remaining two legs are not shown in this view as it is believed that by omitting them the leg fastening means is more clearly illustrated.

After the top portion 17 is formed it is shaped as may be seen in Figure 8. This isometric view of the underneath side of the top portion 17 shows how sides 62 are drawn downwardly from the top surface in a gradual curve until the plane of each of the sides 62 is substantially perpendicular to the plane of the flat surface of the top portion 17. Figure 8 also shows how the center of the top portion 17 is drawn downwardly to form a well portion 63 in which a heating unit 64 may be retained. The well portion 63 is circular and comprises wall means 66 and bottom means 67. The cross-shaped opening which is shown in Figure 5 provides the necessary expansion to permit the downward drawing of the metal and fold lines 70, 71 and 72, are lines along which the flat die stamped piece of metal is bent to establish the well 63.

The wall means 66 of the well portion 63 comprises a circular wall which is substantially perpendicular to the flat surface of the top portion 17 and which has a plurality of bosses 73 spaced about its circumference. The bosses 73 project inwardly from the circumference of the circular wall means and are the only points on the circumference which engage the heating unit 64 which occupies the well portion 63. Because the heating unit 64 and the wall means 63 touch at only four points the heat transfer between the heating unit 64, which is very hot, and the top portion 17 is kept at a minimum. The inwardly turned bottom means 67 provides the necessary support for the heating unit and the cross-shaped opening provides space through which air may easily pass up through the heating unit to give efficient operation.

Figure 8 also shows how the edges 55 of the top portion 17 are turned inward to establish a "truss action" to stiffen the top portion. It will also be seen how the tabs 57 are folded inwardly along fold lines 58 to become the means for attaching the outside legs 61 to the top portion 17.

Figure 4:
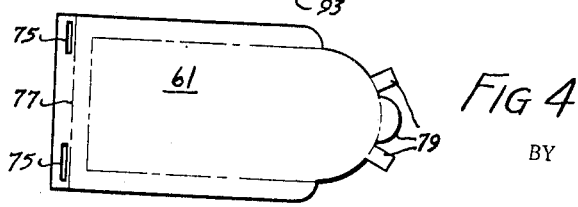
Figure 4 is a plan view of one of the die stamped legs showing a construction line along which the leg is bent.
Figure 12:
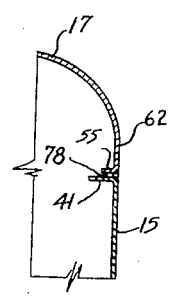
Figure 12 is a cross-sectional view of my heater taken along line 12—12 of Figure 10 showing the space between the top portion and the wall means.

A detailed view of the outside leg 61 is shown in Figure 4. In this view the outside leg has been shaped by a die stamping operation but has not yet been formed by a subsequent bending operation which materially increases its stiffness. Tab slots 75 are provided near one end of the outside legs 61. These slots 75 are adapted to receive the foldable tabs 57 on the top portion 17 and thereby retain the legs 61 in position relative to the top portion. A shoulder 76 is provided in the outside leg 61 by crimping the metal along line 77. This shoulder is adapted to engage the wall means and prevent the wall means from touching the top portion when the various parts are assembled. The space 78 between the downwardly turned sides 62 of top portion 17 and the wall means 15 is illustrated in Figure 12. This space 78 reduces the heat transfer between the top portion and the wall means to such an extent that it is possible to use white or other low temperature paints for the walls where heretofore it has not been possible. At the other end of the outside leg 61 there are provided three foldable tabs 79 which are adapted to engage the bottom edge of the inside legs 43 or 44 and, upon being folded over, clamp the entire wall means tight against the shoulder 76 to establish a substantial and economical means for attaching the wall means to the outside legs 61 which in turn are attached to the top portion 17.

The switch 30 which is attached to the front wall 23 must be kept at a low temperature to preserve the lubricant which is in the movable parts of the switch. This is done by shielding the switch from downward radiation of heat from the heating unit 64 and by reducing heat conduction from the heating unit 64, through the top portion 17, and down the front wall 23. The reduction of the heat conduction is effected by the bosses 73 and by the space 78 as has been previously explained and the shielding from radiation is done by a shield 80. The shield 80 as shown in flat detail in Figure 6 is shown after the die stamping operation which cuts it. Figure 9 shows the shield 80 after it is formed and assembled to the wall means 15. It will be seen in Figure 6 that the shield has a central portion 81 and two side portions 82. The central portion 81 is divided into three sections 85, 86 and 87 by the construction lines 83 along which the central portion is adapted to be folded. Upon folding along lines 83 section 85 becomes the top of the shield, 86 becomes the back of the shield and 87 becomes the bottom of the shield. Fold lines 89 are established along which the shield can be folded to provide sides 82. The top 85 and the bottom 87 of the shield 80 have foldable tabs 90 adapted to pass through the tab slots 25 in the inwardly turned top edge 33 and in the inwardly turned bottom edge 34. The shield 80 is, therefore, substantially completely around the electric switch 30. The angle through which the sides 82 are bent with respect to the back 86 of the shield may vary to provide an opening between the sides 82 and the top 85 and bottom 87 through which cooling air may flow to the switch 30. Notches 91 are provided in the shield 80 through which wires may pass to and from the switch 30.

Figure 3:
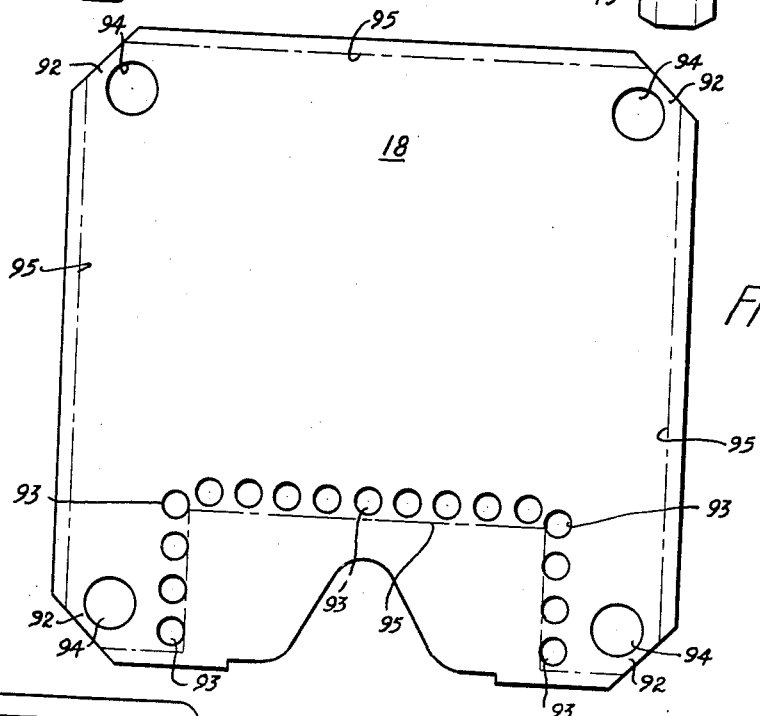
Figure 3 is a plan view of the bottom of my heater.

In Figure 3 I have shown a detailed view of the bottom plate 18 as it appears after the die-stamping operation and before it is formed. The corners are cut on a diagonal line to the sides to enable the bottom 18 to conform to the shape of the wall means 15. Ventilating holes 93 are provided along the front edge of the bottom to help keep the electric switch 30 cool. A hole 94 is positioned in each corner of the bottom portion 18 to facilitate the bending of the foldable tab 50 of the inner leg members 43 and 44. The tabs 50 hold the bottom in place by being bent inward and upward against the thin strip of metal 92 between the hole 94 and the diagonally cut corners. The bottom is adapted to be crimped along the construction lines 95 to increase its stiffness. Figure 9 shows the bottom 18 assembled to the side means 15 by means of the folded tabs 50.

Figure 10:
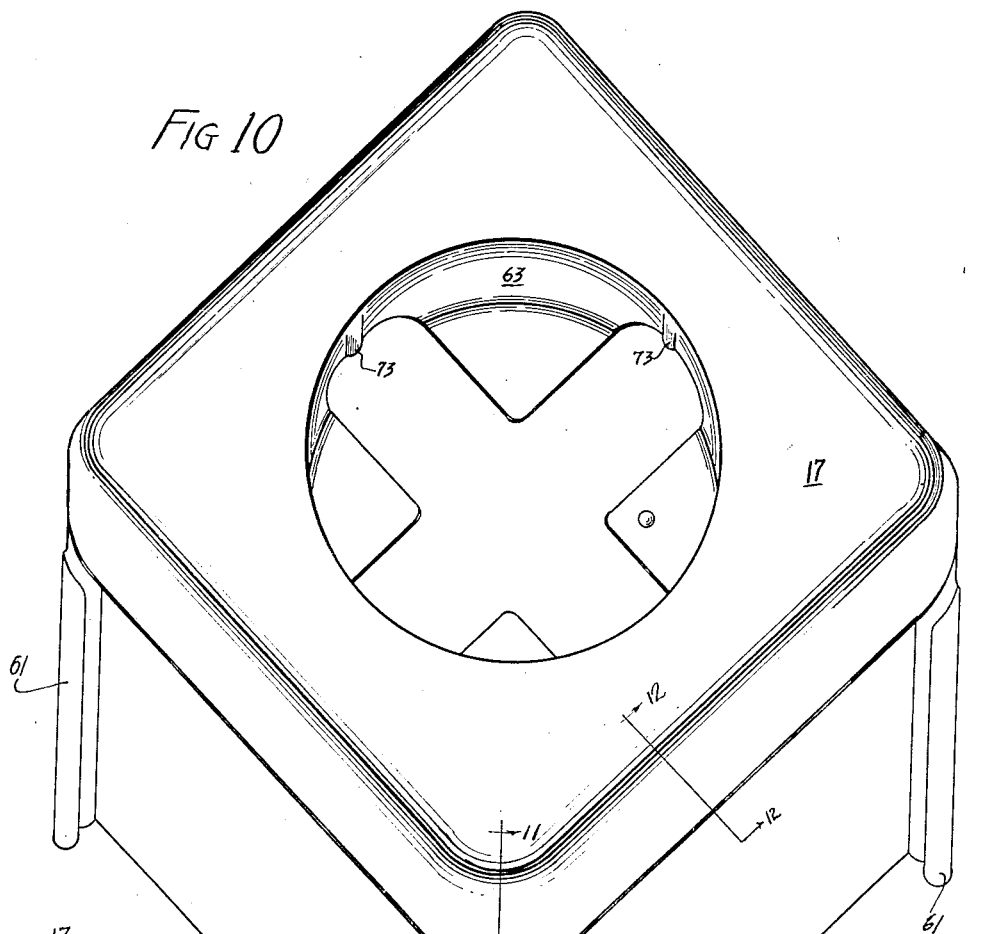
Figure 10 is an isometric view of the top, wall, bottom and leg members assembled.

Figure 10 is an isometric view of my assembled heater showing the well portion 63 and some of the bosses 73 around the circumference of the well.

Figure 7:
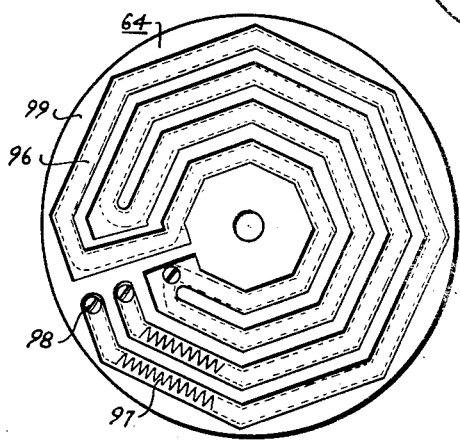
Figure 7 is a plan view of the heating unit showing the fire brick and the heating wires which are retained in grooves in the fire brick.

Figure 7 illustrates the heating unit 64 which is adapted to fit into the well portion 63 in the top of the heater. The heating unit 64 comprises a fire brick base of ceramic material 99 which has a plurality of grooves 96 therein and heating wires 97 which occupy the grooves 96. Terminals 98 pass through the fire brick 99 and are adapted to engage the heating wire 97 to allow electricity to flow therethrough.

Figure 11:
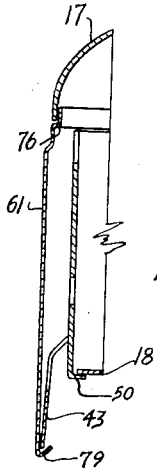
Figure 11 is a cross-sectional view of my heater taken along line 11—11 of Figure 10 showing the method of attaching the wall member to the top portion and of attaching the bottom member to the wall member.

Figure 11 is a sectional view taken along line 11—11 of Figure 10 showing the manner in which the top portion 17 fits over the top edge of the outside leg 61 and showing the manner in which the foldable tabs 79 engage the inner leg member 43 to forcibly hold leg 43 and the wall means 15 against the shoulder 76 to provide a tight assembly. Figure 11 also shows the foldable tab 50 which is on the inner leg 43 holding the bottom portion 18 in place.

Figure 12 is a cross-sectional view taken along line 12—12 of Figure 10 and shows the space 78 which exists between the downwardly turned edge 62 of the top portion 17 and the wall means 15 to materially reduce the heat transfer from the top portion 17 to the wall means 15.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An electric hot plate adapted to be heated by a heating brick and controlled by an electrical switch comprising, in combination, a die stamped rearward wall having top and bottom edges turned inward, two die stamped side walls having their top and bottom edges turned inward and each having a pair of leg members with tabs therein, a die stamped forward wall having a hole therethrough whereby said switch may be controlled and having top and bottom edges turned inward, said top and bottom inward turned edges of said forward wall having slots therethrough, a die stamped top portion having a central depressed portion adapted to receive said heating brick, said top portion having edges turned inward, die stamped leg members having top portions adapted to engage the inside of said top portion and having slots adapted to receive parts of the inwardly turned edges of said top portion, said die stamped leg members covering said side wall leg members and having tabs which engage said side wall leg members, a heat shielding member adapted to shield said electric switch, said heat shielding member having tabs adapted to pass through said slots in the turned edges of said die stamped forward wall, and a bottom member adapted to engage the bottom inwardly turned edges of said rearward, sideward and forward walls and held in place by contact with said tabs on said side wall legs and by contact with said tabs on said heat shielding device.

2. An electric hot plate adapted to be heated by a heating brick and controlled by an electric switch comprising, in combination, a die stamped rearward wall having inwardly turned top and bottom stiffening edges, a die stamped forward wall having inwardly turned top and bottom stiffening edges with spaced slots therethrough, a pair of die stamped side walls having inwardly turned stiffening edges and each side wall having a pair of leg members integral therewith, said integral leg members each having an offset stiffening portion and having a fastening tab member, said forward wall spot welded to said leg members and said rearward wall spot welded to said leg members to form a side enclosure which has auxiliary stiffening means substantially entirely around the perimeter of said side enclosure, a die stamped top member having downwardly turned edges spaced from said forward, rearward and side walls to reduce direct heat conductivity from said top member to said side walls, said top member also having a depressed portion adapted to receive said heating brick, said depressed portion having side walls and bottom heating brick supporting means, said side walls of said depressed portion having a plurality of spaced bosses adapted to constrain said heating brick away from said side walls over substantially the entire perimeter of said side walls to reduce direct heat conductivity from said heating brick to said top portion, said downwardly turned edges of said top portion having inwardly turned edges to stiffen said top portion and to provide leg attaching means, die stamped outside leg members adapted to engage portions of said inwardly turned edges of said top portion and having foldable tabs adapted to engage said side wall leg members, said outside leg members also having an offset portion adapted to engage said forward, rearward and side wall members to retain said top portion and said wall members in spaced relation to reduce the heat flow between said top portion and said wall members, a shielding member having foldable tabs adapted to be inserted through said slots in said turned edges of said forward wall portion to shield said electric switch from heat from said heating brick, and a die stamped bottom member adapted to engage the bottom turned stiffening edges of said wall members and to engage said wall leg members to stiffen said hot plate, said bottom member being held in place by said fastening tab members of said wall leg members and by said foldable tabs of the electric switch shielding means.

3. A substantially enclosed electric hot plate adapted to be heated by a heat block and controlled by an electric switch comprising, in combination, wall means, a top portion and a bottom portion, said wall means comprising a front wall having inwardly turned top and bottom stiffening edges with a plurality of attaching slots therein, a rear wall having inwardly turned top and bottom stiffening edges, and two side units, said side units comprising a side wall disposed in a plane and having inwardly turned top and bottom stiffening edges and two ends constituting inner leg means disposed through a plane at an angle to the plane of the side wall and having foldable tab means, said front wall being spot welded to two of said inner leg means and said rear wall being spot welded to the other two of said inner leg means to establish a substantially rigid side wall enclosure, said top portion comprising a substantially flat top surface with a well portion therein having a bottom and side means adapted to receive and retain said heat block, bosses spaced around said well side means to position said heat block away from said top portion to reduce the heat conductivity from the heat block to the top portion, said top portion also having downwardly turned sides and inwardly turned edges to increase the stiffness of the top portion, outside leg members having an attached end and a bottom edge, said bottom edge being provided with foldable tabs and said attached end being provided with slots to receive portions of the inwardly turned edge of the top portion to attach said outside leg members to said top portion, shoulder means at the attached end of the said outside legs to prevent the wall means from touching the top portion to reduce the heat transfer from said top portion to said wall means, said tabs on the bottom edge of said outside legs being foldable to engage said inner leg means to constrain said wall means to which said inner legs are attached against the said shoulders on the outside legs, an insulating shield adapted to substantially cover the said electrical switch and having foldable tabs thereon adapted to be inserted through the slots in the said inwardly turned edges of the said front wall to reduce the amount of heat reaching the said electrical switch from said heat block, and said bottom portion being adapted to engage the wall means and the inner legs to stiffen the hot plate, said bottom portion being fastened by the foldable tab means on the inner legs and by the foldable tabs through the slots in an inwardly turned edge of the front wall means.

4. An electric hot plate adapted to be heated by a heating unit comprising, in combination, a top having a portion adapted to receive and retain said heating unit, said top having downwardly turned sides and inwardly turned stiffening edges, legs having fastening means and enaaging said inwardly turned stiffening edges, and side enclosing means engaging said legs to establish a space between the downwardly turned sides of said top and said side enclosing means to reduce the flow of heat between said top and said side enclosing means, said fastening means on said legs engaging said side enclosing means to hold said hot plate together.

5. An electric hot plate adapted to be heated by an electric heating wire supported on a heat block comprising, in combination, a top portion having downwardly turned edges and having a well portion adapted to receive and retain said heat block, said well portion having a bottom to support said heat block, said well portion also having wall means with bosses adapted to space said heat block from said top portion to reduce the flow of heat from the heat block to said top portion, side enclosing means, and leg means for supporting said hot plate adapted to engage said downwardly turned edges of said top portion and adapted to engage said side enclosing means to establish a space between said top portion and said side enclosing means to reduce the flow of heat between the top portion and the side enclosing means.

6. An electric hot plate adapted to be heated by a heating unit comprising, in combination, a top having a portion adapted to receive and retain said heating unit, said top having downwardly turned sides and inwardly turned stiffening edges, legs having first and second fastening means thereon, said first fastening means engaging said inwardly turned stiffening edges, and side enclosing means engaged by the said second fastening means on said legs to establish a space between the downwardly turned sides of said top and said side enclosing means to reduce the flow of heat between said top and said side enclosing means.

7. An electric hot plate adapted to be heated by a heating unit comprising, in combination, a top having a portion adapted to receive and retain said heating unit, said top having downwardly turned sides and engaging means, legs having first and second fastening means thereon, said first fastening means engaging said engaging means, and side enclosing means engaged by the said second fastening means on said legs to establish a space between the downwardly turned sides of said top and said side enclosing means to reduce the flow of heat between said top and said side enclosing means.

8. An electric hot plate adapted to be heated by a heating unit comprising, in combination, a top having a portion adapted to receive and retain said heating unit, said top having downwardly turned sides and engaging tab means, legs having first and second fastening means thereon, said first fastening means engaging said engaging tab means, and side enclosing means engaged by the said second fastening means on said legs to establish a space between the downwardly turned sides of said top and said side enclosing means to reduce the flow of heat between said top and said side enclosing means.

WILLIAM A. BARNES.